(12) United States Patent
Augustin et al.

(10) Patent No.: US 8,241,552 B2
(45) Date of Patent: Aug. 14, 2012

(54) METHOD AND APPARATUS FOR PRODUCING A COMPOSITE COMPONENT

(75) Inventors: Helmut Augustin, Hamburg (DE);
Kai-Uwe Dudziak, Stelle (DE); Juergen Falke, Rellingen (DE); Hans Nottbusch, Hamburg (DE); Matthias Schroeder, Langgoens / Espa (DE); Jens Schult, Stelle (DE)

(73) Assignee: Daimler AG, Stuttgart (DE)

( * ) Notice: Subject to any disclaimer, the term of this patent is extended or adjusted under 35 U.S.C. 154(b) by 376 days.

(21) Appl. No.: 12/445,162

(22) PCT Filed: Sep. 25, 2007

(86) PCT No.: PCT/EP2007/008290
§ 371 (c)(1),
(2), (4) Date: Dec. 2, 2009

(87) PCT Pub. No.: WO2008/043432
PCT Pub. Date: Apr. 17, 2008

(65) Prior Publication Data
US 2010/0072678 A1      Mar. 25, 2010

(30) Foreign Application Priority Data
Oct. 12, 2006   (DE) .................. 10 2006 048 290

(51) Int. Cl.
*B29C 45/14*      (2006.01)
(52) U.S. Cl. ............. 264/526; 425/392; 425/129.1; 264/513; 264/516; 264/524
(58) Field of Classification Search .......... 264/510–513, 264/516, 524; 425/504, 510, 512, 519, 522, 425/524, 128, 129.1, 392
See application file for complete search history.

(56) References Cited

U.S. PATENT DOCUMENTS

| 3,082,484 A | * | 3/1963 | Sherman ................ 156/221 |
| 3,600,487 A | * | 8/1971 | Zavasnik ................ 264/515 |
| 4,043,721 A | * | 8/1977 | Lemelson ............... 425/116 |
| 4,113,825 A |   | 9/1978 | Hill et al. |
| 4,874,649 A | * | 10/1989 | Daubenbuchel et al. .... 428/36.5 |

(Continued)

FOREIGN PATENT DOCUMENTS
DE      26 45 855 A1    7/1977
(Continued)

OTHER PUBLICATIONS
International Search Report dated Jan. 11, 2008 including a portion in English (Seven (7) pages).
(Continued)

*Primary Examiner* — Joseph Del Sole
*Assistant Examiner* — Nahida Sultana
(74) *Attorney, Agent, or Firm* — Crowell & Moring LLP

(57) ABSTRACT

In a method and apparatus for producing a composite component, a tubular hollow section blank is placed into a die cavity of a combination tool comprising an inner high-pressure shaping tool and an injection-molding tool. The combination tool is filled with a fluid in such a way that the blank is wetted from the inside by the fluid, and the ends of the combination tool are sealed by two axial molding plugs. The filled blank is then expanded under pressure. The finished hollow section is plastic-coated in the same tool. The hollow section is emptied after shaping in the sealed state, at least until it is no longer dripping, the pressurized fluid being expelled under pressure from the hollow section through at least one discharge channel formed in the axial molding plugs.

5 Claims, 1 Drawing Sheet

U.S. PATENT DOCUMENTS

| | | | |
|---|---|---|---|
| 6,319,574 B1 * | 11/2001 | Slat | 428/35.7 |
| 6,500,379 B1 * | 12/2002 | Wrobbel | 264/515 |
| 6,517,766 B1 * | 2/2003 | Wrobbel | 264/512 |
| 6,676,883 B2 * | 1/2004 | Hutchinson et al. | 264/510 |
| 7,648,662 B2 * | 1/2010 | Pesavento | 264/237 |
| 2003/0077409 A1 | 4/2003 | Schnell | |
| 2005/0123639 A1 * | 6/2005 | Ring et al. | 425/392 |
| 2005/0123640 A1 * | 6/2005 | Mahoney et al. | 425/392 |
| 2006/0210746 A1 * | 9/2006 | Shi et al. | 428/35.7 |
| 2007/0209418 A1 | 9/2007 | Koelln et al. | |
| 2008/0258356 A1 * | 10/2008 | Van Hove et al. | 264/535 |
| 2009/0151929 A1 * | 6/2009 | Saltel | 166/177.4 |

FOREIGN PATENT DOCUMENTS

| | | |
|---|---|---|
| DE | 100 14 332 A1 | 10/2001 |
| DE | 100 14 332 C2 | 3/2002 |
| DE | 103 26 768 A1 | 1/2004 |
| EP | 1676695 B1 * | 4/2009 |
| GB | 1 523 389 | 8/1978 |
| JP | 52-7736 A | 1/1977 |
| JP | 52-93338 A | 8/1977 |
| JP | 2002-514137 A | 5/2002 |
| JP | 2005-334958 A | 12/2005 |
| WO | WO 98/46382 A1 | 10/1998 |
| WO | WO 01/87568 A1 | 11/2001 |
| WO | WO 2005/039799 A1 | 5/2005 |
| WO | WO 2005/061145 A1 | 7/2005 |

OTHER PUBLICATIONS

PCT/ISA/237 including a portion in English (Nine (9) pages).

* cited by examiner

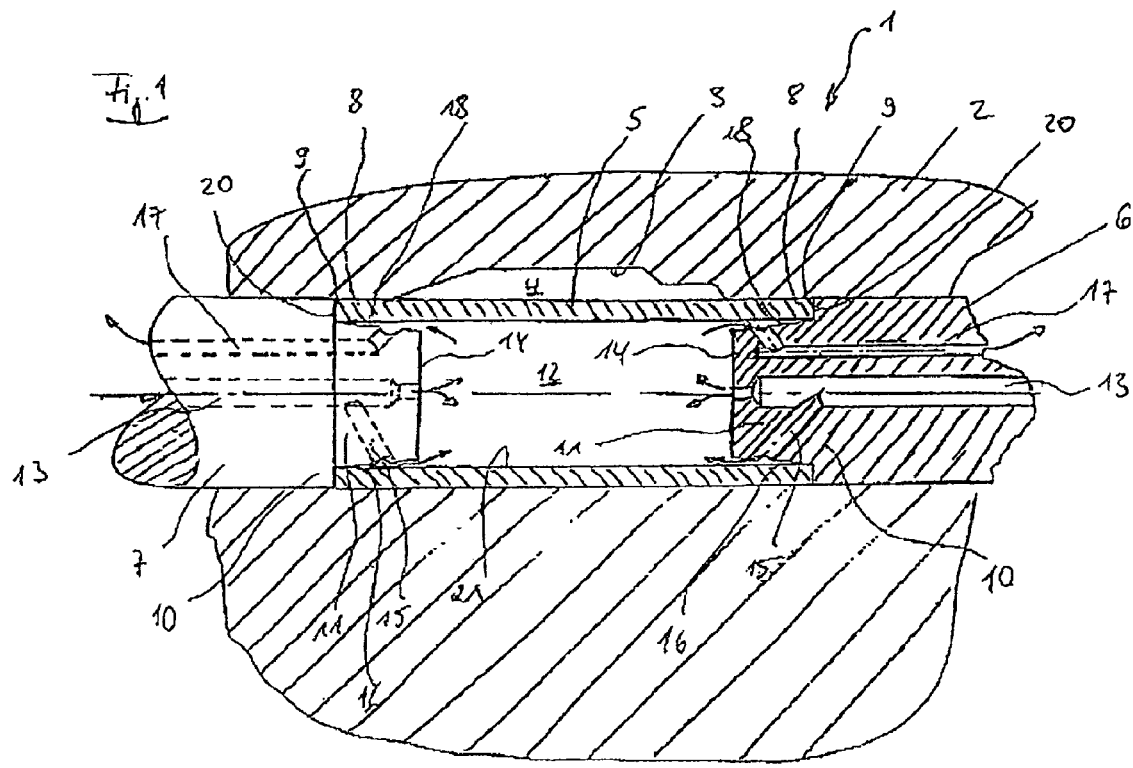
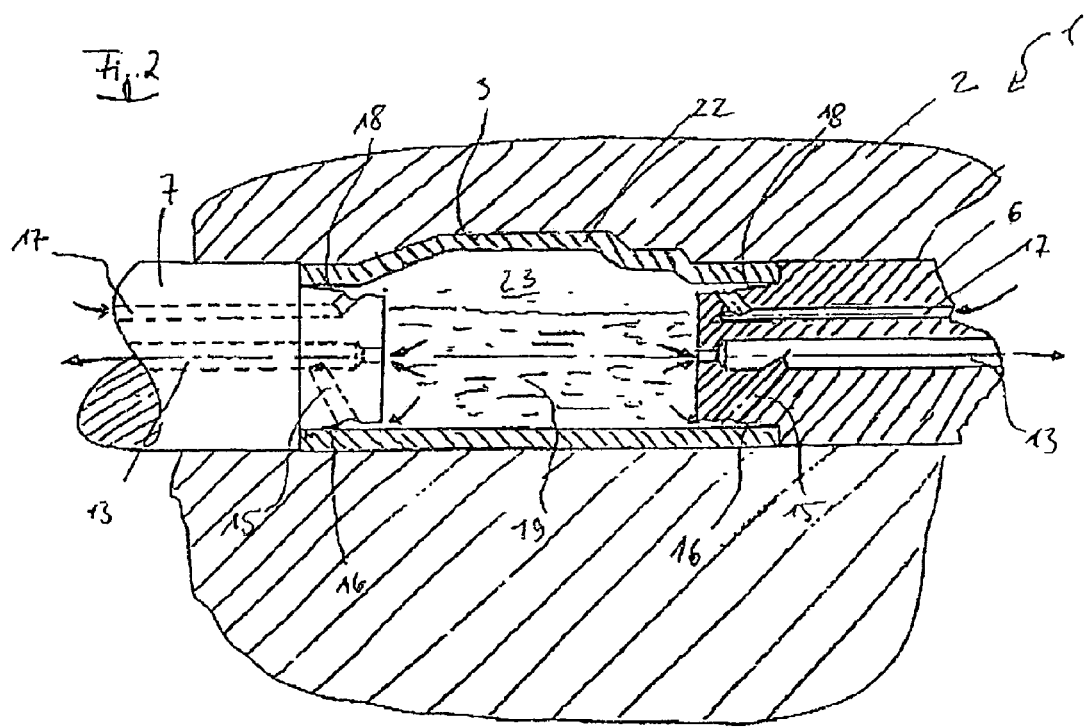

METHOD AND APPARATUS FOR PRODUCING A COMPOSITE COMPONENT

This application is a national stage of International Application No. PCT/EP 2007/008290, filed Sep. 25, 2007, which claims priority under 35 §119 to German Patent Application No. 10 2006 048 290.5, filed Oct. 12, 2006, the entire disclosure of which is herein expressly incorporated by reference.

BACKGROUND AND SUMMARY OF THE INVENTION

The present invention is directed to a method and apparatus for producing a composite component using a combination of inner high pressure shaping and injection molding.

A generic method and apparatus disclosed in German patent document DE 100 14 332 C2, use a combination tool that operates as an inner high-pressure shaping tool and an injection-molding tool. A hollow section blank is placed into the die cavity of the combination tool, filled with pressurized fluid, pressurized and sealed. The combination tool is subsequently closed, so that the hollow section blank abuts the die cavity of the combination tool in a positive fit according to the inner high-pressure shaping method. The finished hollow section is then plastic-coated in the same tool by activating the injection-molding tool via an injection channel, which is discharged into a cavity integrated in the die cavity.

The pressure is reduced in the finished composite component after cooling and curing of the plastics, and the composite component is then emptied of the pressurized fluid. Thereafter, the combination tool is opened and the composite component is removed therefrom.

During the filling of the hollow section blank and the emptying of the composite component of pressurized fluid, the blank is not only wetted on the inside, but a part of the pressurized fluid also reaches the die cavity of the combination tool. With the conventional inner high-pressure shaping methods and inner high-pressure molding tools, such carry-over of the pressurized fluid is not critical, as the pressurized fluid can be displaced in the further process independently due to the acting surface pressure.

During the plastic-coating of the component in the subsequent injection molding process (which takes place in the same tool), a clean, nonwetted surface is necessary for both the component and the tool die cavity. Otherwise, the process and the quality of the composite component are adversely affected, as the plastic often reacts with the pressurized fluid. That is, when plastic melt impinges and a vapor phase ensues, gas bubbles can result in the plastics, so that the desired rigidity is not achieved after curing of the plastics. There will be at least impairments of the plastics surface due to streaking. The adhesion of the cured plastic element at the hollow section is possibly insufficient, as the pressurized fluid which has reached the die cavity can be pressed between the plastic mass and the surface of the hollow section.

One object of the invention is to provide a method by which further composite component can be produced easily and reliably, as well as an apparatus for performing the method.

This and other objects and advantages are achieved by the method and apparatus according to invention, which includes an emptying device, with which the shaped hollow section is emptied in the sealed state at least until it is no longer dripping. The pressurized fluid is expelled from the hollow section via at least one discharge channel formed in the axial molding plug, so that no pressurized fluid can reach the combination tool during the later removal of the finished composite component. As a result, the pressurized fluid part which otherwise remains in the tool cannot come into contact with the plastic mass.

The process reliability of the production method is considerably increased in this manner, achieving an improved adhesion of the plastics at the hollow section, and avoiding the loss of rigidity which would otherwise result. The discharge of the pressurized fluid or the emptying of the component to the drip-free state preferably takes place at the finished composite component, as the pressurized fluid is to remain in the shaped hollow section during the injection molding to counteract the injection molding pressure and thereby avoid collapses of the hollow section connected therewith.

In the method and apparatus according to the invention, the spatial arrangement of the device for producing the composite component is irrelevant, and installation in a workshop becomes considerably more flexible. The amount of the pressure applied to expel the pressurized fluid is determined such that no additional mechanical deformations result in the finished composite component in the region of the coating. It is possible to subject the pressurized fluid to an increased temperature for emptying so that it can be discharged from the composite component as vapor under high pressure, which can lead to the total drying out of the hollow section in the ideal case.

The passage and the discharge channel can be formed easily in the axial molding plug without significantly reducing its rigidity. The use of a combination tool to produce the composite component, so the inner high-pressure shaping and the injection molding are performed with one and the same die cavity, makes it unnecessary to transfer the hollow section to another cavity or to another tool for the coating. As a result, transfer faults depending on the position are avoided on the one hand, and the combination tool can be more compact on the other hand.

Transfer faults can otherwise lead to increased rejects, which is cost-intensive and burdens the resources unnecessarily. Furthermore, quality-preserving measures which detect faulty parts and possibly convert them into good parts, are not necessary. The production time is furthermore shortened considerably, as a time-intensive transfer is unnecessary. Furthermore, when using a simple steel material of low quality for the hollow section, a corrosion initiated with this and thereby the composite component is inhibited at least considerably by means of the pressurized fluid discharge according to the invention.

In a particularly preferred embodiment of the invention, the blank is widened in the closed combination tool by the high pressure charge of the pressurized fluid. As a result, the blank is reliably shaped to the hollow section, without bending or developing folds such as can occur with the mentioned state of the art. The blank material is present within the die cavity, from which it cannot escape in the closed state of the combination tool, and can thus widen as desired due to the highly pressurized fluid and abut the die cavity of the combination tool with a positive fit.

Corresponding to a preferred embodiment of the device according to the invention, the axial molding plugs respectively have a passage channel which enters the blank on the one hand, and is connected to a fluid high pressure generating plant on the other hand. The fluid enclosed in the blank can thereby be adapted in a very sensitive manner to the respective further widening step and be charged with different pressure levels, so that blanks which are shaped in a more complex manner can also be brought into their final shape reliably before they are plastic-coated as a finished hollow section. Support pressures can be applied to the hollow section during the injection molding by the possibility achieved thereby to control the fluid pressure in a variable manner, which support pressures are considerably lower than the previously needed shaping pressures. Thus, it is prevented that the forming composite component fails to expand or deforms in an undesired manner.

A particularly preferred embodiment, the device according to the invention has a pressure supply unit for the leakage- and drip-free emptying, by means of which the pressurized fluid can be charged with pressure for expelling. The leakage- and drip-free emptying of the finished composite component is accelerated considerably by the arrangement of the pressure supply unit, so that the entire production time is increased only insignificantly. The pressure supply unit is connected to the interior of the hollow section via the passage, so that a separate line need not be provided therefore, which could possibly impair the rigidity of the axial molding plug.

In a further preferred embodiment of the invention, the pressure supply unit operates with negative pressure. Moreover, according to a feature of the invention, the pressurized fluid is extracted from the hollow section, and advantageously, only the passage is used for this purpose, so that an additional channel does not have to be formed in the axial molding plug. This reduces the effort with regard to the apparatus during the formation of the axial molding plug significantly. It is furthermore conceivable to introduce a line in the form of a hose or a hollow cylinder into the hollow section via the passage, which can be guided at the interior wall of the hollow section or the composite component in a very exact manner. The humidity film often still adhering during emptying is thereby also collected, which considerably increases the efficiency of the drying.

In a particularly preferred embodiment of the invention, the pressure supply unit forms the fluid high-pressure generating plant (or at least a part thereof), which operates in an inverted manner relative to the pressure direction, to expel the pressurized fluid during the widening phase of the hollow section blank. This achieves a considerable simplification of the entire device according to the invention, because a separate negative pressure supply can be omitted. The inversion of the fluid high pressure generating plant is very simple with regard to its control technology and only needs a low effort. As the fluid high pressure generating plant is designed to provide extremely high positive pressures for the widening phase of the hollow section blank, this is correspondingly also valid for the generation of negative pressure in the inverted operating phase. As a result, the pressurized fluid is removed particularly fast from the hollow section or the composite component and that the complete drip-free state is thereby achieved very quickly. The effective direction change of the plant naturally only takes place only after the coating of the finished hollow section, or in a temporal overlap still partially during the coating process if still only low or no support pressures need to be provided. The passage thereby forms the passage channel and/or the discharge channel. Here it is also observed in a form simplifying the device, that only the channels needed compellingly are used for expelling the fluid. The channels obtain double or multiple functions in an economic convenient manner over the period of the entire production process of the composite component, wherein the passage channel during the widening phase of the hollow section blank is for example used for the high pressure generation and, in the discharge phase, for the removal of the pressurized fluid.

In a particularly preferred further embodiment of the invention, the pressurized fluid is expelled by charging the interior of the hollow section with compressed air via a pressure supply channel that is separate from the discharge channel in the axial molding plug. For this purpose, the pressure generating unit is used according to another further embodiment of the invention. An additional channel is necessary in the axial molding plug, but the pressurized fluid is removed particularly quickly from the hollow section or the composite component, with the pressurized fluid displaced to the outside via the discharge channel. The pressurized fluid further absorbs the pressurized fluid humidity remaining in the hollow section and discharges it via the discharge channel, ensuring quick emptying of the interior of the hollow section. The compressed air does not have to be guided directly to the humid locations in the interior of the hollow section, as it whirls in the hollow section and absorbs the humidity present there, so that the latter is discharged to the outside by the compressed air flow.

In a further particularly preferred embodiment of the invention, the discharge channel is arranged at the geodesic lowest location of the axial molding plug. As the pressurized fluid or the remaining humidity substantially settles at the geodetic lowest location due to gravity, the pressurized fluid and the humidity can be expelled particularly effectively from the interior of the hollow section via the discharge channel. Structural drawbacks with the axial molding plugs conventional in the inner high-pressure shaping technique, the central passage channels thereof have a relative high outlet and thus complicate or totally prevent the complete discharge of the pressurized fluid or the humidity, are removed by this advantageous arrangement.

In a further preferred embodiment of the device according to the invention, the passage channel forms the discharge channel. The formation of the axial molding plug is thus simplified, wherein the passage channel again has a double function. The passage channel can alternatively also extend centrally in the axial molding plug, wherein the discharge channel then enters this, so that the passage channel takes on the function of the discharge channel already shortly before the exit into the interior of the hollow section if the course of the discharge channel is well designed. In a countermove, the discharge channel can be instrumental for the pressure build-up during the widening phase of the hollow section profile by fluidic inner high pressure, by also introducing a partial flow of the pressurized fluid into the interior of the hollow section via the discharge channel, whereafter the pressurized fluid can be charged with pressure via the fluid high pressure generating plant through the common fluidic connection between the passage and the discharge channel with the same pressure in both paths.

According to the preferred arrangement of the method and apparatus according to the invention, the hollow section blank is sealed by the axial molding plugs prior to filling. Thereafter, the hollow section is filled by introducing the pressurized fluid via a supply bore formed at least in the axial molding plug. The air enclosed in the hollow section blank is simultaneously discharged therefrom via a separate venting channel of at least one of the axial molding plugs. Thus, no pressurized fluid can enter the die cavity of the combination tool during the filling of the hollow section blank, and trigger the above-mentioned problems. The process reliability is ensured over the entire production cycle by preventing this possible penetration of the pressurized fluid in the die cavity of the combination tool. The interior of the hollow section is filled completely by the pressurized fluid during the filling, and the inside wall of the hollow section blank is wetted throughout. The enclosed air escapes via the venting channel during filling, wherein ideally no air is present in the hollow section blank after the completed filling. The filling can preferably take place in the closed state of the combination tool, whereby the shaping of the hollow section blank by means of fluidic inner high pressure can follow immediately after the filling. The closing of the combination tool and the filling of the hollow section blank can also take place simultaneously—so as to shorten the production time further—.

In a particularly preferred further embodiment of the invention, the venting channel is identical to the pressure supply channel, and the supply bore is identical to the discharge channel and/or the passage extending in the axial molding plug. Due to the multifunctional adoption of the individual channels, at most three channels need be formed in the axial molding plugs, which means a low apparatus effort, without degrading the rigidity of the axial molding plug.

The channels and bores in the axial molding plugs can be equipped with valves, which are opened or closed corresponding to the respective production phase of the composite component, so that the respective function of the channels is clearly defined and the axial molding plugs can thus satisfy the different requirements in the entire production process of the component while performing the respective function.

Other objects, advantages and novel features of the present invention will become apparent from the following detailed description of the invention when considered in conjunction with the accompanying drawings.

BRIEF DESCRIPTION OF THE DRAWINGS

FIG. 1 shows a lateral longitudinal section of a device according to the invention during filling a hollow section blank in the closed state of the combination tool according to the invention; and FIG. 2 is a lateral longitudinal sectional view of the device according to the invention of FIG. 1 during emptying of the finished composite component.

DETAILED DESCRIPTION OF THE DRAWINGS

FIG. 1 is shows a device according to the invention for producing a composite component. A combination tool 1 is composed of an inner high-pressure shaping tool 2 and an injection molding tool (including a pressured fluid tank 30 and a pump 31). The inner high-pressure shaping tool 2 has a die cavity 3, which is identical to that of the combination tool and defines a molding space 4, in which is a hollow section blank 5 is inserted. The injection molding tool is integrated in the inner high-pressure shaping tool 2 and connected to a cavity integrated in the die cavity 3, via an injection channel.

After placing the hollow section blank 5 in the die cavity 3, the latter is closed. (The closed state of the combination tool is shown in FIGS. 1 and 2.) During the closing process or subsequently, two axial molding plugs 6 and 7 are inserted into the blank ends 8, forming a high pressure fluid-tight seal. The axial molding plugs 6 and 7 have radially projecting shoulders formed at the ends thereof, which abut the finishing edges 20 of the tubular hollow section blank 5. The ends 10 of the axial molding plugs 6 and 7 include at a centrally arranged tapering heads 11 which immerse into the interior 12 of the hollow section.

After sealing of the hollow section blank 5 is completed, it is filled with a pressurized fluid 19 (FIG. 2). For this purpose, the device 1 has a filling arrangement that includes the tank 30 from which the pressurized fluid 19 is introduced into the interior 12 of the hollow section blank 5. To this end, the axial molding plugs 6 and 7 have central inlet bores 13, which discharge at the front ends 14 of the heads 11 of the axial molding plugs 6 and 7 and which are connected to the tank at the other side via the pump 30. Each of the central inlet bores 13 has a branch 15 for accelerated filling, which discharges at a lower shoulder 16 of the head 11 at the lowest geodetic point (relative to the vertical) of the axial molding plug 6 and 7, as shown in FIGS. 1 and 2.

The hollow section blank 5 is filled completely with pressured fluid 19, so that its inner side 21 is wetted by the pressurized fluid 19. The air enclosed in the hollow section blank 5 escapes via venting channels 17 extending in the axial molding plugs 6 and 7, which open into the hollow section blank 5 at upper shoulders 18 of the heads 11 of the respective axial molding plugs 6 and 7. Thus air is discharged from the interior 12 of the hollow section blank 5 to the outside by the displacement via the pressurized fluid 19. The venting channels 17 are separate from the central supply bore 13 and the branches 15 in the axial molding plugs 6 and 7.

After the filling, a fluid high pressure generating plant is connected to a passage channel of the axial molding plugs 6 and 7, which discharges into the interior 12 of the hollow section blank 5. In particular, for this purpose, the passage channel may be the same as the central supply bore 13 and its branch 15. However, the passage channel may also be provided separately from the supply bore 13 in the axial molding plug 6 and 7. Moreover, it is also possible that the fluid high pressure generating plant is integrated in the filling circuit and contains the feed pump 31 which feeds the pressurized fluid 19 from the tank 30 to the hollow section blank 5.

A pressure element of the fluid high pressure generating plant is coupled in for generating a fluid high pressure on the fluid 19 within the hollow section blank 5, so that the hollow section blank 5 expands under the influence of this highly pressurized fluid and conforms to the shape of the die cavity 3 of the combination tool in a positive fit, as shown in FIG. 2. The hollow section blank 5 is formed to the desired hollow section 22 in this state.

Subsequently to the shaping, the hollow section 22 is plastic-coated by the integrated inner high-pressure shaping tool. For this purpose, the injection molding tool is connected to the cavity in the hollow section 22, which conforms to the die cavity 3 of the combination tool, via an injection channel. The coating can take place at the location of the previous shaping of the hollow section 22, so that the injection molding material assumes a positive fit with the shaping of the hollow section 22, further improving the adhesion of the plastic material at the hollow section 22, and thereby increasing the durability of the composite component. It is also possible, however, to coat the hollow section 22 in another location, if the requirements directed towards the composite component so specify.

After curing of the injection-molded plastics, the hollow section 22 or the composite component is emptied. For this purpose, the fluid high pressure is relieved, and the interior 23 of the hollow section is connected to an emptying device via a passage formed in the axial molding plug 6 and 7. The emptying device has thereby a pressure supply unit, which the pressurized fluid 19 can be pressurized to expel it from the interior 23 of the hollow section. The pressure supply unit can operate with negative pressure and can be the same as the fluid high pressure generating plant or a part thereof. In that case, for expelling the pressurized fluid 19, the fluid high pressure generating plant operates in an inverted manner with regard to its pressure direction, counter to the direction during the widening phase of the hollow section blank 5. The same passage thereby forms both the passage channel and the supply bore 13. A discharge channel further extends in the axial molding plug 6 and 7, which is identical to the branch 15 and forms part of the passage. The pressurized fluid 19 is then extracted from the interior 23 of the hollow section by means of the fluid high pressure generating plant via the supply bore 13 and the branch 15. The hollow section 22 is simultaneously filled with air which flows into the interior 23 of the hollow section via the venting channel 17.

However, in the embodiment according to FIG. 2, the pressure generating unit operates with compressed air which is placed into the interior 23 of the hollow section via a pressure supply channel that extends in the axial molding plugs 6 and 7, and is formed by the venting line 17. The pressurized fluid 19 is now expelled into the tank under pressure from the interior 23 of the hollow section via the discharge channel and the passage. The compressed air flow at the same time also serves to dry the interior 23 of the hollow section. The inlet of the discharge channel or of the branch 15 is arranged at the geodetic lowest location of the axial molding plugs 6 and 7, so that pressurized fluid 19 can also be guided to the outside, if its level is below the passage. It is thereby possible to guide the entire pressurized fluid 19 from the interior 23 of the hollow section to the outside. Even though the venting channel 17 is identical to the pressure supply channel via which the compressed air is introduced in the present embodiment, these channels can also extend separately from one another in the axial molding plugs 6 and 7. The same is true of the passage, which is equated here to the passage channel, via which the fluid high pressure is built up, and the supply bore. This is also true for the discharge channel, which corresponds here to the passage channel or a part of the passage channel, and the branch 15 of the supply bore 13.

After emptying the interior 23 of the hollow section, which now has at least reached a state in which it is no longer dripping, the axial molding plugs 6 and 7 are retracted from the interior 23 of the hollow section, so that the hollow section 22 lies free in the die cavity 3 of the combination tool. This is subsequently opened and the finished composite component is removed from the die cavity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for producing a composite component, said method comprising:
    placing a tubular, hollow section blank into a die cavity of a combination tool that constitutes both an inner high-pressure shaping tool and an injection-molding tool;
    sealing ends of the combination tool by two axial molding plugs;
    filling the combination tool with a pressurized fluid such that the blank is wetted from the inside by the fluid, and the filled blank is expanded under pressure, wherein the pressurized fluid is not air; and
    using the same combination tool to plastic-coat the finished hollow section; wherein,
    the hollow section is emptied after shaping in the sealed state at least until it is no longer dripping; and
    the pressurized fluid is expelled under pressure from the hollow section through at least one discharge channel formed in the axial molding plug.

2. The method according to claim 1, wherein the pressurized fluid is extracted from the hollow section.

3. The method according to claim 1, wherein the pressurized fluid is expelled by charging the interior of the hollow section with compressed air, which is introduced into the interior of the hollow section via a pressure supply channel that formed in the axial molding plug, separate from the discharge channel.

4. The method according to claim 1, wherein:
    the hollow section blank is sealed by the axial molding plugs prior to the filling;
    the hollow section blank is filled by introducing the pressurized fluid by at least one supply bore formed in the axial molding plug; and
    air enclosed in the hollow section blank is simultaneously discharged therefrom by a discharge channel formed separate from the supply channel of at least one of the axial molding plugs.

5. The method according to claim 1, wherein the blank is expanded in the closed combination tool by a high pressure charge of the pressurized fluid.

\* \* \* \* \*